United States Patent [19]

Oda

[11] Patent Number: 5,415,308
[45] Date of Patent: May 16, 1995

[54] BRANCH JOINT BOX

[75] Inventor: Akihiro Oda, Yokkaichi, Japan

[73] Assignee: Sumitomo Wiring Systems, Ltd., Yokkaichi, Japan

[21] Appl. No.: 231,762

[22] Filed: Apr. 25, 1994

[30] Foreign Application Priority Data

Jun. 22, 1993 [JP] Japan .................. 5-033535 U

[51] Int. Cl.$^6$ .................................. H05K 7/12
[52] U.S. Cl. .................. 220/3.2; 220/4.02; 220/306
[58] Field of Search ............ 220/3.2, 3.8, 3.94, 220/306, 307, 346, 351, 4.02

[56] References Cited

U.S. PATENT DOCUMENTS

| 3,745,664 | 7/1973 | Altseimer | 220/3.8 X |
| 4,421,246 | 12/1983 | Schultz et al. | 220/306 X |
| 4,538,731 | 9/1985 | Cillario | 220/306 X |
| 4,541,036 | 9/1985 | Landries et al. | 220/306 X |
| 4,896,784 | 1/1990 | Heath | 220/3.2 X |

FOREIGN PATENT DOCUMENTS 0468869 1/1992 European Pat. Off. .

OTHER PUBLICATIONS

U.K. Search Report.

Primary Examiner—Steven M. Pollard
Attorney, Agent, or Firm—Sandler, Greenblum & Bernstein

[57] ABSTRACT

A branch joint box including a lower casing and an upper casing, in which a first locking projection formed on an inner surface of one of outer peripheral walls of the lower and upper casings and a second locking projection formed on an outer surface of the other of the outer peripheral walls of the lower and upper casings ride over each other so as to be brought into engagement with each other such that the lower and upper casings are locked to each other, wherein when the first and second locking projections are viewed in a vertical direction of the branch joint box by locking the lower and upper casings to each other, one of the first and second locking projections is disposed rearward of the other of the first and second locking projections and a width of the one of the first and second locking projections is so set as to be larger than that of the other of the first and second locking projections.

1 Claim, 3 Drawing Sheets

BRANCH JOINT BOX

BACKGROUND OF THE INVENTION

The present invention generally relates to a branch joint box for performing branching of a circuit through branch joint of connectors of wiring harness, etc. for a motor vehicle and more particularly, to a branch joint box including a lower casing and an upper casing, in which it is possible to easily judge whether or not the lower and upper casings have been locked to each other through fitting.

In a branch joint box used for joining a wiring harness, etc. for a motor vehicle to various electrical parts by branching, branch joint points are concentrated at one spot so as to reasonably and economically join a circuit by branching. In response to rise of densities of wires of the wiring harness, various types of branch joint boxes have been developed.

For example, as shown in FIG. 1, a known branch joint box includes a lower casing 1 and an upper casing 2. The lower and upper casings 1 and 2 are locked to each other through fitting, while upper and lower portions of the lower and upper casings 1 and 2 locked to each other through fitting are closed by upper and lower covers (not shown), respectively. In this known branch joint box, when an outer surface of an outer peripheral wall 2a of the upper casing 2 is fitted into an inner surface of an outer peripheral wall 1a of the lower casing 1, a locking projection 1b formed on the inner surface of the outer peripheral wall 1a of the lower casing 1 rides over a locking projection 2b formed on the outer surface of the outer peripheral wall 2a of the upper casing 2 so as to be carried to an upper side of the locking projection 2b as shown in FIGS. 3 and 4. Thus, the locking projection 1b of the lower casing 1 is brought into engagement with the locking projection 2b of the upper casing 2 such that the lower and upper casings 1 and 2 are locked to each other.

When the lower and upper casing 1 and 2 are locked to each other by fitting the upper casing 2 into the lower casing 1, the outer peripheral wall 1a of the lower casing 1 deflects through a height of the locking projection 1b, for example, 2 mm outwardly from the outer peripheral wall 2a of the upper casing 2 in an incomplete engagement state in which the locking projection 2b rides onto the locking projection 1b as shown in FIG. 5. From this deflection of the outer peripheral wall 1a of the lower casing 1, it is possible to judge that the locking projections 1b and 2b are in the incomplete engagement state.

However, prior to the incomplete engagement state, the outer peripheral wall 1a of the lower casing 1 does not deflect outwardly from the outer peripheral wall 2a of the upper casing 1. Meanwhile, in a complete engagement state, the locking projection 2b of the upper casing 2 is disposed under the locking projection 1b of the lower casing 1 as shown in FIG. 4. However, as shown in FIG. 2, the locking projection 2b disposed under the locking projection 1b in the complete engagement state has a width 12 equal to a width 11 of the locking projection 1b. Thus, even if the locking projection 1b of the outer peripheral wall 1a and the locking projection 2b of the outer peripheral wall 2a are visually inspected from above, it is difficult to judge whether the locking projections 1b and 2b are in the complete engagement state or the incomplete engagement state.

SUMMARY OF THE INVENTION

Accordingly, an essential object of the present invention is to provide, with a view to eliminating the above mentioned drawback inherent in conventional branch joint boxes, a branch joint box in which it is possible to easily judge whether or not upper and lower casings have been locked to each other through fitting.

In order to accomplish this object of the present invention, a branch joint box according to the present invention includes a lower casing and an upper casing, in which a first locking projection formed on an inner surface of one of outer peripheral walls of the lower and upper casings and a second locking projection formed on an outer surface of the other of the outer peripheral walls of the lower and upper casings ride over each other so as to be brought into engagement with each other such that the lower and upper casings are locked to each other, wherein when the first and second locking projections are viewed in a vertical direction of the branch joint box by locking the lower and upper casings to each other, one of the first and second locking projections is disposed rearward of the other of the first and second locking projections and a width of the one of the first and second locking projections is so set as to be larger than that of the other of the first and second locking projections.

In the branch joint box of the present invention, the width of the one locking projection disposed rearward of the other locking projection when the lower and upper casings have been locked to each other is so set as to be larger than that of the other locking projection. Therefore, in accordance with the present invention, if the locking projections between the outer peripheral walls of the lower and upper casings are visually inspected in the vertical direction of the branch joint box, it is possible to judge, when the wider locking projection is disposed rearward of the narrower locking projection, that the locking projections are in a complete engagement state. On the contrary, when the wider locking projection is not disposed rearward of the narrower locking projection, it is possible to judge that the locking projections are in an incomplete engagement state.

BRIEF DESCRIPTION OF THE DRAWINGS

This object and features of the present invention will become apparent from the following description taken in conjunction with the preferred embodiment thereof with reference to the accompanying drawings, in which.

DETAILED DESCRIPTION OF THE INVENTION

Figure 1:
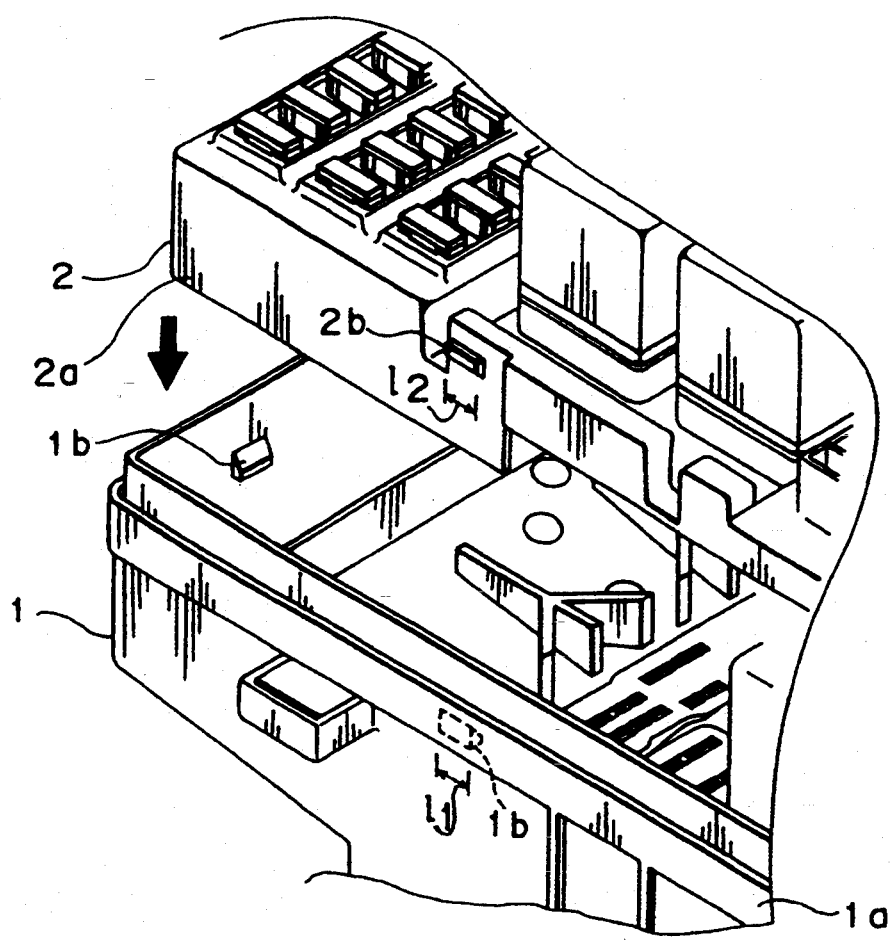
FIG. 1 is an exploded perspective view of a prior art branch joint box (already referred to)
Figure 2:
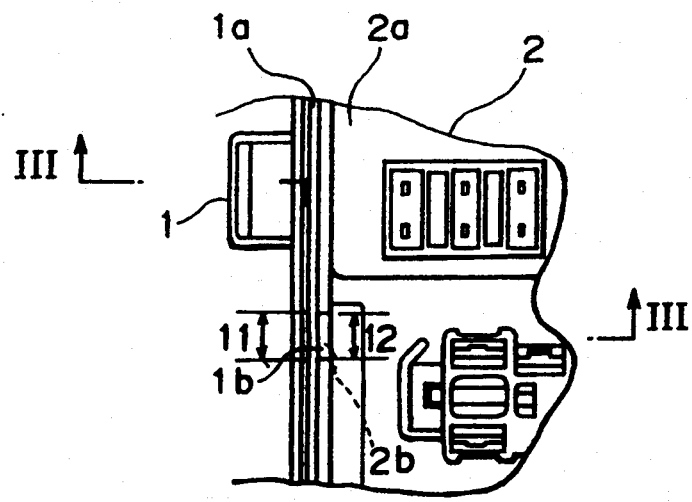
FIG. 2 is a fragmentary top plan view of the prior art branch joint box of FIG. 1 (already referred to)
Figure 3:
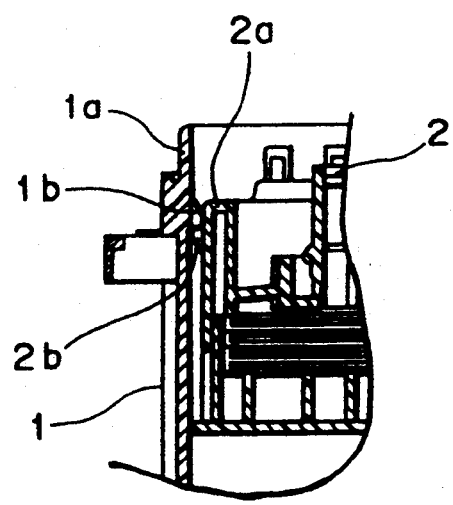
FIG. 3 is a sectional view taken along the line III—III in FIG. 2 (already referred to)
Figure 4:
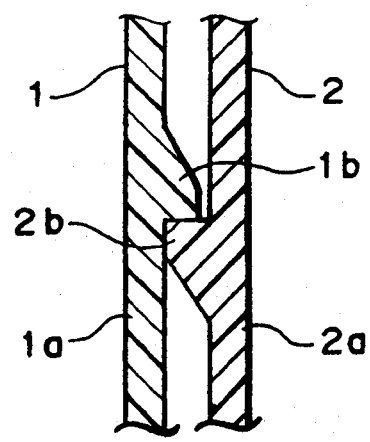
FIG. 4 is a sectional view showing a complete engagement state of locking projections of the prior art branch joint box of FIG. 1 (already referred to)
Figure 5:
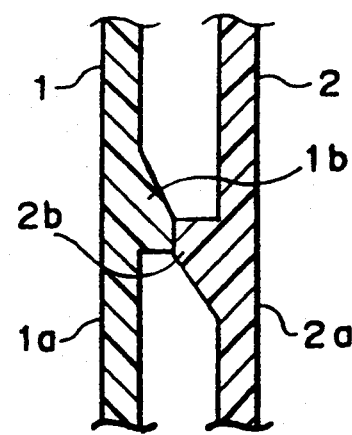
FIG. 5 is a sectional view showing an incomplete engagement state of the locking projections of FIG. 4 (already referred to)
Figure 6:
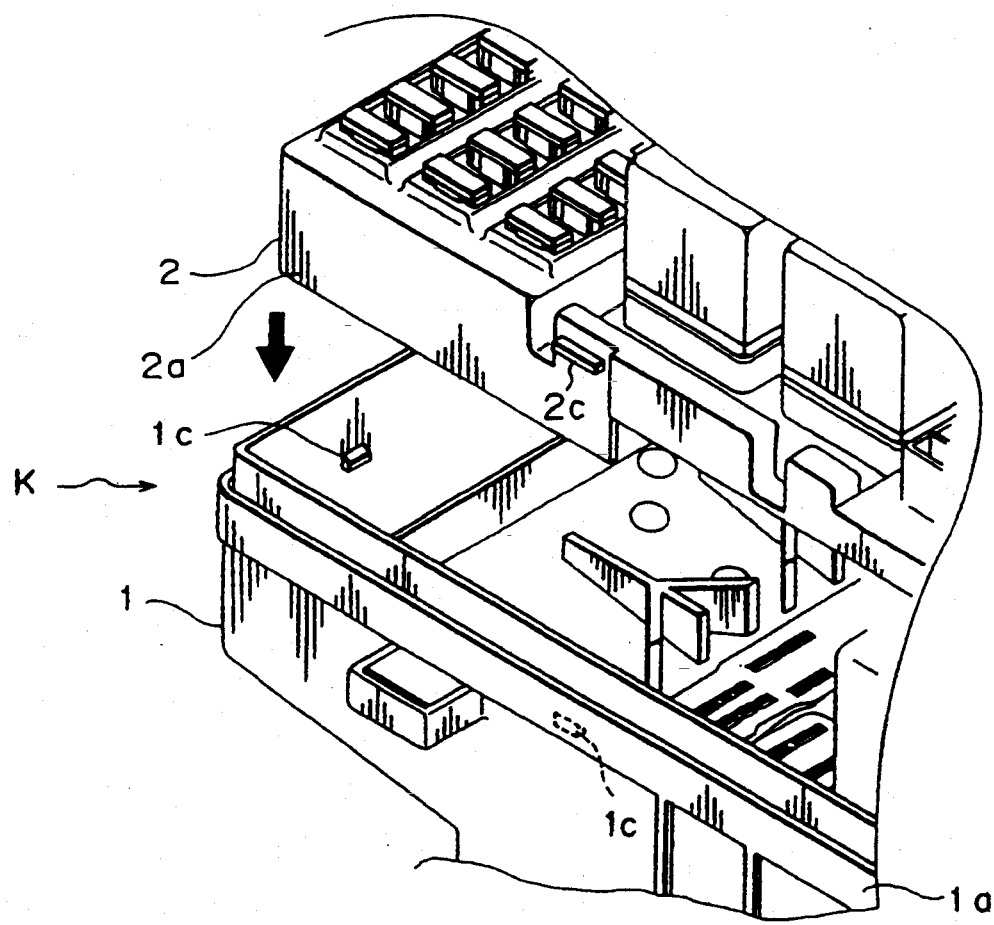
FIG. 6 is an exploded perspective view of a branch joint box according to the present invention.
Figure 7:
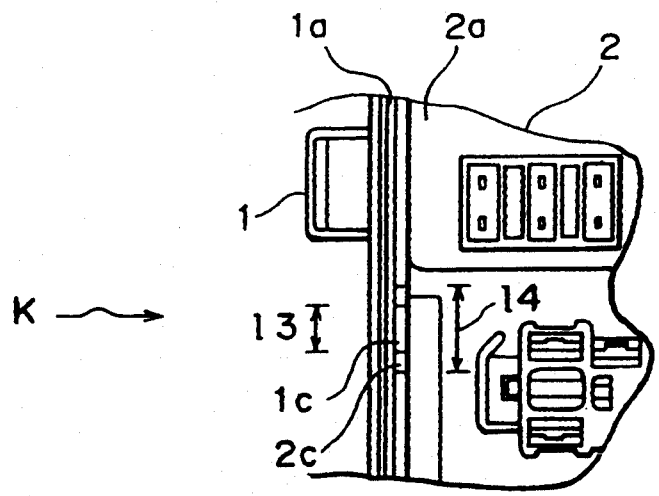
FIG. 7 is a fragmentary top plan view of the branch joint box of FIG. 6.

Referring now to the drawings, there is shown in FIGS. 6 and 7, a branch joint box K according to one embodiment of the present invention. The branch joint box K includes a lower casing 1 and an upper casing 2. A locking projection 1c is formed at a proper position on an inner surface of an outer peripheral wall 1a of the lower casing 1, while a locking projection 2c engageable with the locking projection 1c is formed at a proper position on an outer surface of an outer peripheral wall 2a of the upper casing 2.

As shown in FIG. 7, a width 14 of the locking projection 2c of the upper casing 2 is so set as to be larger than a width 13 of the locking projection 1c of the lower casing 1. For example, supposing that the width 13 of the locking projection 1c is 7 mm, the width 14 of the locking projection 2c is 12 mm.

When the outer surface of the outer peripheral wall 2a of the upper wall 2 is fitted into the inner surface of the outer peripheral wall 1a of the lower wall 1, the locking projection 1c of the lower casing 1 is caused to ride over the locking projection 2c of the upper casing 2 and thus, is carried to an upper side of the locking projection 2c so as to be brought into engagement with the locking projection 2c such that the lower and upper casings 1 and 2 are locked to each other.

If opposite side portions of the locking projection 2c having the width 14 larger than the width 13 of the locking projection 1c are observed between the outer peripheral walls 1a and 2a of the lower and upper casings 1 and 2 and under the locking projection 1c when locking of the lower and upper casings 1 and 2 is visually inspected, the locking projection 2c is disposed at a lower side of the locking projection 1c and thus, it is possible to judge that the locking projections 1c and 2c are in a complete engagement state.

On the other hand, when the opposite side portions of the locking projection 2c of the upper casing 2 are not observed between the outer peripheral walls 1c and 2c and under the locking projection 1c, the locking projection 2c having the width 14 larger than the width 13 of the locking projection 1c is disposed at an upper side of the locking projection 1c and thus, it is possible to judge that the lower and upper casings 1 and 2 are in an incomplete engagement state.

Therefore, in the branch joint box K of the present invention, by merely visually inspecting the locking projections 1c and 2c between the outer peripheral walls 1a and 2a of the lower and upper casings 1 and 2 from above, the engagement states of the lower and upper casings 1 and 2 can be judged easily and positively.

Meanwhile, in this embodiment, the outer surface of the outer peripheral wall 2a of the upper casing 2 is fitted into the inner surface of the outer peripheral wall 1a of the lower casing 1. However, the present invention is not restricted to this arrangement but is directed to an arrangement in which when the locking projections of the lower and upper casings are viewed in a vertical direction of the branch joint box in the complete engagement state, one locking projection is disposed rearward of the other locking projection and a width of the one locking projection is so set as to be larger than that of the other locking projection. For example, in case an outer surface of the outer peripheral wall of the lower casing is fitted into an inner surface of the outer peripheral wall of the upper casing, the locking projection of the upper casing is disposed under the locking projection of the lower casing in the complete engagement state in FIG. 6. However, at this time, a gap between the outer peripheral walls of the upper and lower casings is shielded by an upper wall of the upper casing and thus, cannot be viewed from above the branch joint box in FIG. 6. Therefore, in this case, since the gap between the outer peripheral walls of the upper and lower casings should be viewed from below in FIG. 6, the locking projection formed on the outer surface of the outer peripheral wall of the lower casing is disposed rearward of the locking projection formed on the inner surface of the outer peripheral wall of the upper casing, so that a width of the locking projection of the lower casing is so set as to be larger than that of the locking projection of the upper casing.

As is clear from the foregoing description of the branch joint box of the present invention, when the locking projections of the lower and upper casings are viewed in a vertical direction of the branch joint box in the complete engagement state, one of the locking projections of the lower and upper casings is disposed rearward of the other of the locking projections the lower and upper casings and a width of the one locking projection is so set as to be larger than that of the other locking projection. Therefore, if the locking projections formed on the outer peripheral walls of the lower and upper casings are visually inspected in the vertical direction of the branch joint box, it is possible to judge, when the wider locking projection is viewed rearward of the narrower locking projection, that the locking projections are in the complete engagement state. On the contrary, if the wider locking projection cannot be viewed rearward of the narrower locking projection, it is possible to judge that the locking projections are in the incomplete engagement state.

Consequently, in accordance with the present invention, since it is possible to easily and positively judge whether or not the upper and lower casings are locked to each other, working efficiency of assembly of the branch joint box is improved and it is possible to positively eliminate such a case in which the branch joint box in the incomplete engagement state is transferred to the next process.

What is claimed is:

1. A branch joint box including a lower casing having a first outer peripheral wall and an upper casing having a second outer peripheral wall, in which a first locking projection formed on an inner surface of one of the first and second outer peripheral walls of the respective lower and upper casings and a second locking projection formed on an outer surface of the other of the first and second outer peripheral walls of the respective lower and upper casings ride over each other so as to be brought into engagement with each other such that the lower and upper casings are locked to each other, a visible gap being formed between the first and second outer peripheral walls, said gap being visible from outside the lower and upper casings when the lower and upper casings are locked to each other, wherein when the first and second locking projections are viewed in a vertical direction in the visible gap of the branch joint box, and when the lower and upper casings are locked to each other, one of the first and second locking projections is disposed rearward of the other of the first and second locking projections and a width of the one of the first and second locking projection is so set as to be larger than the width of the other of the first and second locking projections, so that when the lower and upper casings are completely locked to each other, both of the first and second locking projections are visible from the outside in the visible gap, and when the lower and upper casings are not completely locked to each other, only the one of the first and second locking projections which has the larger width is visible from the outside in the visible gap.

* * * * *